United States Patent
Weiss

(10) Patent No.: US 11,292,498 B2
(45) Date of Patent: Apr. 5, 2022

(54) LATERALLY OPERATING PAYLOAD HANDLING DEVICE

(71) Applicant: SEEGRID CORPORATION, Pittsburgh, PA (US)

(72) Inventor: Mitchell Weiss, Carlisle, MA (US)

(73) Assignee: SEEGRID CORPORATION, Pittsburgh, PA (US)

(*) Notice: Subject to any disclaimer, the term of this patent is extended or adjusted under 35 U.S.C. 154(b) by 905 days.

(21) Appl. No.: 16/103,389

(22) Filed: Aug. 14, 2018

(65) Prior Publication Data

US 2019/0054944 A1    Feb. 21, 2019

Related U.S. Application Data

(60) Provisional application No. 62/545,802, filed on Aug. 15, 2017.

(51) Int. Cl.
| | | |
|---|---|---|
| *B62B 3/06* | (2006.01) | |
| *B66F 9/18* | (2006.01) | |
| *B66F 9/06* | (2006.01) | |
| *B66F 9/10* | (2006.01) | |
| *B66F 9/12* | (2006.01) | |

(52) U.S. Cl.
CPC ............. *B62B 3/06* (2013.01); *B66F 9/06* (2013.01); *B66F 9/10* (2013.01); *B66F 9/12* (2013.01); *B66F 9/18* (2013.01); *B62B 2202/10* (2013.01); *B62B 2202/90* (2013.01); *B62B 2203/24* (2013.01); *B62B 2203/26* (2013.01); *B62B 2203/28* (2013.01); *B62B 2501/02* (2013.01)

(58) Field of Classification Search
CPC ... B62B 3/06; B62B 2202/10; B62B 2202/90; B62B 2203/24; B62B 2203/26; B62B 2203/28; B62B 2501/02; B66F 9/06; B66F 9/10; B66F 9/12; B66F 9/18
USPC ....................................................... 280/6.15
See application file for complete search history.

(56) References Cited

U.S. PATENT DOCUMENTS 9,624,077 B1    4/2017  Jordan et al.
2009/0189132 A1    7/2009  Meijer et al.

FOREIGN PATENT DOCUMENTS

| DE | 102014100865 | 7/2015 |
|---|---|---|
| DE | 202013001256 | 3/2017 |
| JP | 2002080195 | 3/2002 |
| JP | 2006321598 | 11/2006 |
| KR | 20090079804 | 7/2009 |

(Continued)

OTHER PUBLICATIONS

Japanese Office Action dated Jun. 8, 2021 issued in corresponding Japanese Application No. 2020-508456, with machine translation to English.

(Continued)

*Primary Examiner* — John D Walters
*Assistant Examiner* — Hilary L Johns
(74) *Attorney, Agent, or Firm* — Onello & Mello, LLP

(57) ABSTRACT

A loading frame includes a rectangular u-shaped frame with an opening at one side, forks extendable and retractable between the closed side and the open side of the U-shaped frame, loading frame wheels on one arm of the U-shaped frame, and a truck interface on the other arm of the U-shaped frame. The loading frame wheels and truck interface support travel of the frame in a direction other than the direction of travel of the forks between the open and closed sides of the U-shaped frame.

20 Claims, 20 Drawing Sheets

(56) References Cited

FOREIGN PATENT DOCUMENTS

WO          9532917          12/1995

OTHER PUBLICATIONS

International Search Report and Written Opinion dated Nov. 7, 2018 issued in corresponding International Application No. PCT/US2018/046709.
Korean Notice of Allowance dated Oct. 27, 2021 issued in corresponding Korean Application No. 10-2020-7002166.

LATERALLY OPERATING PAYLOAD HANDLING DEVICE

RELATED APPLICATIONS

This application claims benefit of U.S. Provisional Application No. 62/545,802, filed Aug. 15, 2017, and entitled LATERALLY OPERATING PAYLOAD HANDLING DEVICE, which is hereby incorporated by reference in its entirety.

FIELD OF INTEREST

Inventive concepts relate to equipment, vehicles, and methods used for handling and transporting payloads, such moving pallets and/or bulk goods in warehouse and/or shipping environments.

BACKGROUND

Handling pallets and other loads using conventional fork trucks and pallet jacks requires reversing direction for load acquisition ("forking") and then returning to the forward direction for travel. Such an operation may entail not just complex maneuvering of a heavy, bulky vehicle and load, but may also block aisles and impede the flow of other vehicles during the turning movements. Additionally, valuable warehouse space may be consumed to ensure that aisles are wide enough to accommodate such maneuvering.

That is, a fork truck typically travels nose first down an aisle to a pick-up location. It then reverses direction and rotates 90 degrees to engage its forks with the pallets. This requires an aisle as least as wide as the fork truck is long. After positioning in this manner, the load is engaged, and the vehicle pulls out into the aisle, turns 90 degrees and continues travel. Reversing direction and turning requires significant time for acceleration, deceleration, and reduced speed on turns, all of which add to the cost of operation.

With a laterally operating payload handler, the time, space, and blockages are significantly reduced. Laterally operated payload handlers are especially useful for high speed sorting operations or factory lineside servicing, which happen at high frequencies. Aisle widths can be reduced by ½ over conventional aisles, increasing capital utilization.

Lateral loading and unloading is known and employed by "Turret Trucks" and VNA (very narrow aisle) trucks. However, turret trucks are expensive and, because turret trucks require significant mass as counterweights to maintain stability, they are also expensive to operate and maintain.

SUMMARY

In accordance with aspects of the inventive concepts, provided is a loading frame, comprising a frame with one or more loading frame wheels arranged to facilitate travel of the frame in a frame travel direction and one or more forks coupled to the frame and configured to extend and retract in a fork direction that is transverse to the frame travel direction. The forks are further configured to engage load when extended and support a load for travel when retracted.

In various embodiments, the frame includes a wheel-end arm, a truck-end arm, and a side member connecting the wheel-end arm and truck-end arm at respective side-member ends, and at least one of the one or more loading frame wheels is coupled to the wheel-end arm.

In various embodiments, the loading frame further comprises a truck interface formed in the truck-end arm configured to couple with a payload truck configured to move the frame in the travel direction.

In accordance with another aspect of the inventive concepts, provided is a payload handler, comprising a payload truck and a loading frame coupled to the payload truck The loading frame includes a frame comprising one or more loading frame wheels arranged to facilitate travel of the frame in a frame travel direction, a truck interface configured to couple with a payload truck, and one or more forks coupled to the frame and configured to extend and retract in a fork direction that is transverse to the frame travel direction. The forks are further configured to engage load when extended and support a load for travel when retracted.

In accordance with another aspect of the inventive concepts, provided is a payload handler, comprising a payload truck and a loading frame coupled to the payload truck. The loading frame includes a frame comprising one or more loading frame wheels arranged to facilitate travel of the frame in a frame travel direction, a truck interface configured to couple with a payload truck, and one or more forks coupled to the frame and configured to extend and retract in a fork direction that is transverse to the frame travel direction. The forks are further configured to engage a load when extended and support a load for travel when retracted. The term "transverse" is used to include any direction, to the left or to the right (with corresponding frame openings), at any angle to, including perpendicular to or oblique to, the direction of travel. For example, the forks may operate, in example embodiments, either to the left or to the right of the frame travel direction.

In accordance with another aspect of the inventive concepts, provided is a payload handler includes a loading frame and a truck. The loading frame may be integral to, or modular with, the truck. In example embodiments a loading frame in accordance with principles of inventive concepts includes one or more loading frame wheels at one end (a wheel end), a truck interface at the opposite end (a truck end), and one or more lifting forks (or, simply, forks) oriented at ninety degrees to the loading frame direction of travel, which may be defined by a line extending between the wheel end and truck interface end of the loading frame. The one or more loading frame wheels (also referred to herein, simply, as loading frame wheels) may be configured to be aligned with the drive wheels, or steered wheels, of an associated payload truck. The loading frame wheels are configured to articulate and to thereby raise or lower the loading frame in concert with the truck similarly raising or lowering the loading frame at the truck end.

In example embodiments the articulated loading frame wheels may be powered by mechanical, hydraulic, or electrical operation. Their articulation is arranged in parallel with the lifting or lowering of the truck interface by the payload truck and may be controlled by an operator, by an electronic controller, or by a combination of automatic, or autonomous, control and operator control.

A loading frame in accordance with principles of inventive concepts may include a carriage with rails that supports forks on fork wheels, allowing the forks to rollingly extend or retract in order to engage and retrieve a load. The loading frame may include extenders configured to extend and retract the forks. The extender may be mechanical, electrical, or hydraulic, for example, and may operate under control of an operator, an electronic controller, or a combination of automatic control and operator control. The extender may exhibit accordion action in example embodiments.

In example embodiments a controller may provide navigation or fork-placement control, either autonomously, or in conjunction with direct control by an operator.

In accordance with another aspect of the inventive concepts, provided is a loading frame includes a rectangular frame including a first, wheel-end arm, a second, truck-end arm, and a side member connecting the wheel-end arm and truck-end arm at respective side-member ends. With only one side member and two arms, the rectangular frame exhibits an overall "U" shape. One or more loading frame wheels are configured to roll in a loading frame direction of travel and to support the loading frame while traveling in the loading frame direction of travel, the loading frame wheels attached to the wheel-end arm. A truck interface formed in the truck-end arm is configured to couple with a payload truck and to thereby obtain support from the payload truck. One or more forks are configured to extend and retract in a fork direction that is other than the loading frame direction of travel.

In example embodiments in accordance with principles of inventive concepts a loading frame includes forks with a fork direction that is perpendicular to the loading frame direction of travel.

In example embodiments in accordance with principles of inventive concepts a loading frame includes a fork carriage to support at least one fork.

In example embodiments in accordance with principles of inventive concepts a loading frame includes a fork carriage drive and fork carriage support.

In example embodiments in accordance with principles of inventive concepts a loading frame includes a fork carriage drive that includes accordion-style folding drive members.

In example embodiments in accordance with principles of inventive concepts a loading frame includes a fork carriage support that includes rails and fork carriage wheels to rollingly support the fork carriage as it moves in the fork carriage direction.

In example embodiments in accordance with principles of inventive concepts a loading frame includes a u-shaped frame including an open and a closed side. One or more forks are extendable and retractable in a direction between the closed and open sides of the u-shaped frame. Loading frame wheels are positioned on a wheel-end arm of the u-shaped frame and a truck interface is located on a truck-end arm of the u-shaped frame. The loading frame wheels and truck interface support travel of the loading frame in a direction other than the direction of travel of the fork between the open and closed sides of the u-shaped frame.

In example embodiments in accordance with principles of inventive concepts a loading frame includes a fork carriage to support the fork and to extend a plurality of forks in a direction between the open and closed sides of the u-shaped frame.

In example embodiments in accordance with principles of inventive concepts a loading frame includes loading frame wheels that are extendable in vertical and horizontal directions to thereby, respectively, raise or lower the loading frame.

In example embodiments in accordance with principles of inventive concepts a loading frame includes a truck interface that includes a linkage configured to allow a payload truck to control the vertical or horizontal extending of the loading frame wheels to thereby raise or lower the frame.

In example embodiments in accordance with principles of inventive concepts a loading frame includes wheel-end and truck-end arms of that include rails and a fork carriage includes fork carriage wheels to rollingly support the carriage on the rails.

In example embodiments in accordance with principles of inventive concepts a loading frame includes fork, wherein the direction of travel of the fork between open and closed sides of a u-shaped frame is perpendicular to the direction of travel of the loading frame.

In accordance with another aspect of the inventive concepts, provided is a payload handler includes a payload truck and a loading frame coupled to the payload truck. The loading frame includes a rectangular frame including a first, wheel-end arm, a second, truck-end arm, and a side member connecting the wheel-end arm and truck-end arm at respective side-member ends, this configuration exhibiting an overall "U" shape. One or more loading frame wheels are configured to roll in a loading frame direction of travel and to support the loading frame while traveling in the loading frame direction of travel. The loading frame wheels are attached to the wheel-end arm and a truck interface formed in the truck-end arm is configured to couple with a payload truck and to thereby obtain support from the payload truck. One or more forks are configured to extend and retract in a fork direction that is other than the loading frame direction of travel.

In example embodiments in accordance with principles of inventive concepts a payload handler includes a fork with a fork direction perpendicular to a loading frame direction of travel.

In example embodiments in accordance with principles of inventive concepts a payload handler includes a fork carriage to support at least one fork.

In example embodiments in accordance with principles of inventive concepts a payload handler includes a fork carriage that includes a fork carriage drive and fork carriage support.

In example embodiments in accordance with principles of inventive concepts a payload handler includes a fork carriage drive that includes accordion-style folding drive members.

In example embodiments in accordance with principles of inventive concepts a payload handler includes a fork carriage support that includes rails and fork carriage wheels to rollingly support the fork carriage as it moves in the fork direction.

In example embodiments in accordance with principles of inventive concepts a payload handler includes a payload truck that is configured to operate the loading frame wheels to extend in a horizontal direction and to simultaneously lower the truck-end of the loading frame or to operate the loading frame wheels to extend in a vertical direction and to simultaneously raise the truck-end of the loading frame.

In example embodiments in accordance with principles of inventive concepts a payload handler includes a payload truck that is configured to operate autonomously.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements.

The drawings are not necessarily to scale, emphasis instead being placed upon illustrating aspects of the invention. In the drawings.

DETAILED DESCRIPTION OF PREFERRED EMBODIMENTS

Figure 1A:
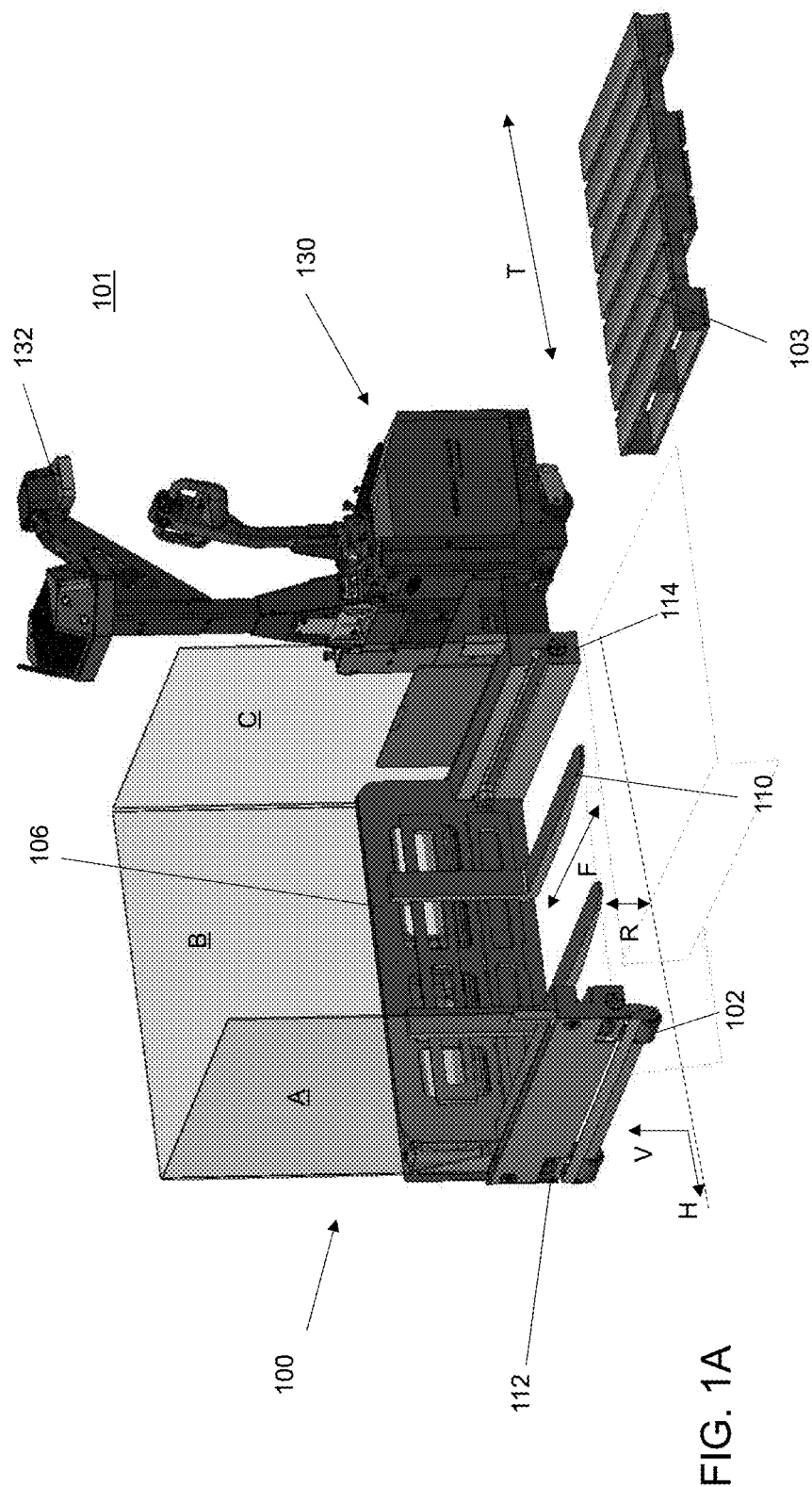
FIGS. 1A through 1F illustrate a sequence in which a payload handler in accordance with principles of inventive concepts engages a load.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items. The term "or" is not used in an exclusive or sense, but in an inclusive or sense.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In example embodiments, a payload handler includes a loading frame and a truck. The loading frame may be integral to, or modular with, the truck. In example embodiments a loading frame in accordance with principles of inventive concepts includes one or more loading frame wheels at one end (a wheel end), a truck interface at the opposite end (a truck end), and lifting forks (or, simply, forks) oriented at ninety degrees to the loading frame direction of travel. The loading frame direction of travel may be defined by a line extending between the wheel end and truck interface end of the loading frame. The one or more loading frame wheels (also referred to herein, simply, as loading frame wheels) may be configured to be aligned with the drive wheels, or steered wheels, of an associated payload truck. The loading frame wheels are configured to articulate and to thereby raise or lower the loading frame in concert with the payload truck simultaneously raising or lowering the loading frame at the truck end.

In example embodiments the articulated loading frame wheels may be powered by mechanical, hydraulic, or electrical drive mechanisms. In various embodiment, articulation of the loading frame wheels is arranged to be in concert with the lifting or lowering of the truck interface by the truck and may be controlled by an operator, by an electronic controller, or by a combination of automatic control and operator control.

A loading frame in accordance with principles of inventive concepts may include a carriage with rails that supports forks on fork wheels, allowing the forks to rollingly extend or retract in order to engage and retrieve a load. The loading frame may include extenders configured to extend and retract the forks. The extender may be mechanical, electrical, or hydraulic, for example, and may operate under control of an operator, an electronic controller (for autonomous or semi-autonomous control), or a combination of autonomous control and operator control. The extender may exhibit accordion action in example embodiments.

A controller and sensors, which may be provided in a sensor head, for example, may provide navigation or fork-placement control, either autonomously, or in conjunction with direct control by an operator.

FIGS. 1A through 1F illustrate an example embodiment of a payload handler 101 comprising a loading frame 100 and a payload truck 130, and a sequence of operations that can be carried out by the foregoing, in accordance with principles of inventive concepts. The loader frame 100 can be configured to receive, carry, and deliver at least one load, such as a palletized load of goods. In some embodiments, the payload frame 100 is configured to removably couple to the loader truck 130. In other embodiments, the loader truck 130 and the loader frame 100 can form a single vehicle. In some embodiments, the loader truck 130 can be motorized, with a drive system. In other embodiments, the loader truck 130 can be human powered.

The payload handler 101 can be configured to travel to a pickup/drop-off station, e.g., in a warehouse or other storage facility or area. Once at the pickup/drop-off location, the loading frame 100 is configured to operate in a side-load, or laterally-operating, manner to engage or disengage a load, such as a pallet of goods. Such operation can reduce operating time, operational space requirements, and blockages in a warehouse, factory, or other load-handling environment.

A payload handler 101 including loading frame 100 in accordance with principles of inventive concepts may be especially useful for operations that proceed with a high frequency, such as, high-speed sorting operations or factory lineside servicing, as examples. Such a payload handler may allow aisle widths to be reduced by as much as half over conventional aisles, increasing capital utilization. Because a payload handler in accordance with principles of inventive concepts may operate laterally, without requiring a significant mass, such as a counterweight to maintain stability, a payload handler in accordance with principles of inventive concepts may provide the benefits of lateral operation without the expense and maintenance demands associated with a turret truck, for example.

In FIG. 1A, payload handler 101 includes the loading frame 100 coupled to the payload truck 130, which is configured to drive the payload handler to pickup/drop-off locations to receive and deliver loads, e.g., palletized loads. The payload handler 101, including loading frame 100, can be configured to travel along a payload handler direction of travel "T".

In the present embodiments, the loading frame 100 includes forks 110 configured to be selectively raised and lowered to engage, carry, and disengage a pallet. In FIG. 1A, forks 110 are shown in an elevated, or raised, position a distance "R" above a ground plane (e.g., warehouse floor). In a preferred embodiment, the forks are generally disposed transverse to a forward travel direction T of the loading frame 100 and payload handler 101. In the embodiment of FIG. 1A, forks 110 are raised during travel of the payload handler 101.

The bottom of the loading frame 100 includes a first, wheel-end arm 112, a second, truck-end arm 114 opposite the wheel-end arm 112, and a side member 106 connecting the wheel-end arm 112 and truck-end arm 114 at respective side-member ends. The side member 106 and the two arms 112, 114 can be arranged to have an overall "U" shape, e.g., with forks 110 disposed therein. The forks 101 can be configured and arranged to extend out from the loading frame 101 to engage or disengage with a pallet.

In the present embodiment, the wheel-end arm 112 includes one or more loading frame wheels 102 configured to roll in a loading frame direction of travel "T" and to support the loading frame while traveling. A truck interface formed in the truck-end arm 114 is configured to couple with the payload truck 130 and to thereby obtain support from the payload truck 130. In other embodiments, the truck-end arm 114 could also have one or more loading frame wheels. The forks 110 can be maintained within the loading frame 100 during travel and can be configured to extend and retract in a fork direction "F" that is other than the loading frame direction of travel T. In various embodiments, the fork direction F is perpendicular to the travel direction T.

In example embodiments, forks 110 are elevated by operation of loading frame wheels 102 of the wheel-end arm 112, which are extended in a vertical direction "V." The opposing end of loading frame 100 is raised substantially the same amount by operation of payload truck 130, which can be accomplished, for example, by raising a mast coupled to the truck-end arm 114. In this embodiment, therefore, the loading frame 100 is in a raised position during travel of the payload handler 101.

Figure 1B:
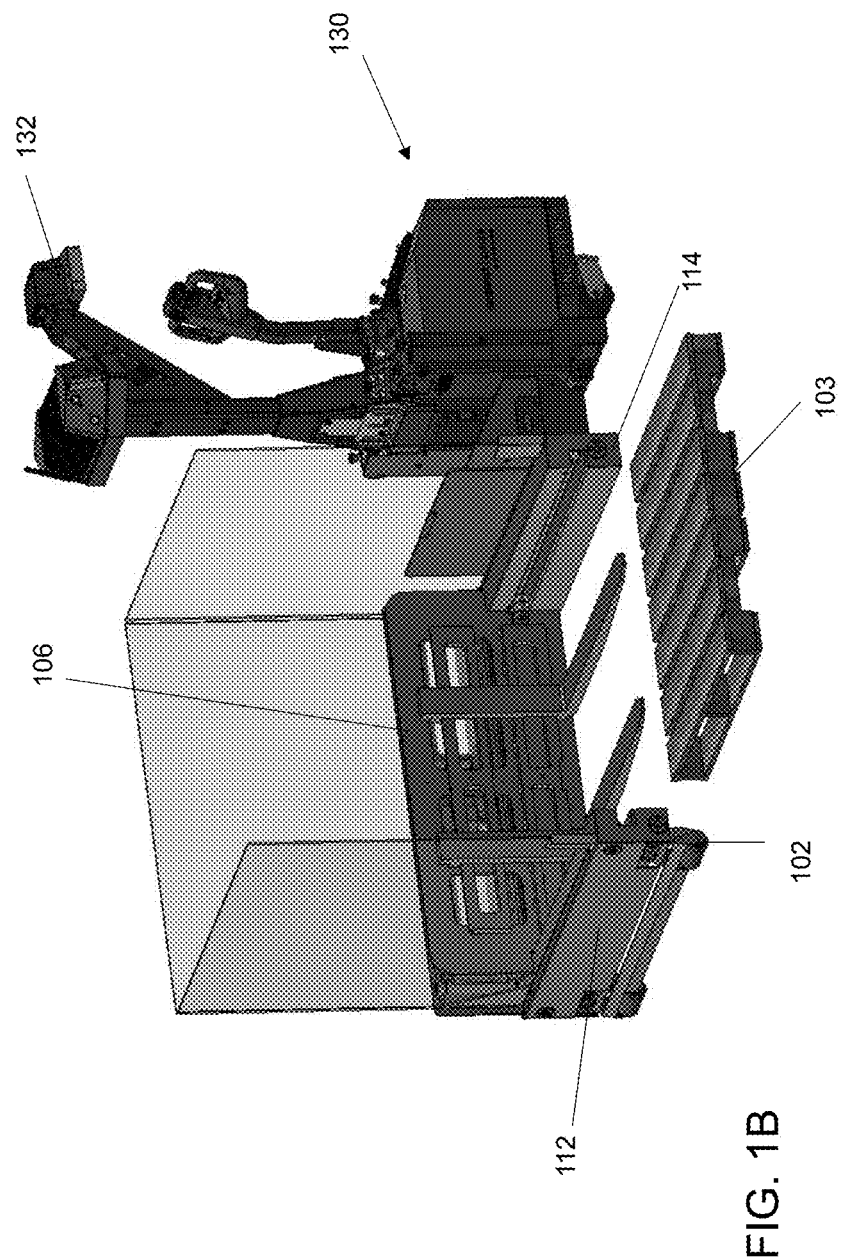

In FIG. 1B payload handler 101 has arrived at a pickup/drop-off station and forks 110 are aligned with mating openings in pallet 103. In example embodiments in accordance with principles of inventive concepts, such alignment may be achieved manually, automatically, employing electronic sensing and alignment, or using a combination of autonomous and manual navigation. Autonomous navigation, or auto-navigation, may be implemented by sensor head 132, which may include or be coupled to sensors, a controller, and storage, as described, for example, in US Patent Application 2014/0074341, published Dec. 31, 2012, which is hereby incorporated by reference in its entirety. At this point in the load retrieval sequence, forks 110 are maintained in an elevated and retracted position, as is evidence by raised loading frame wheels 102.

Figure 1C:
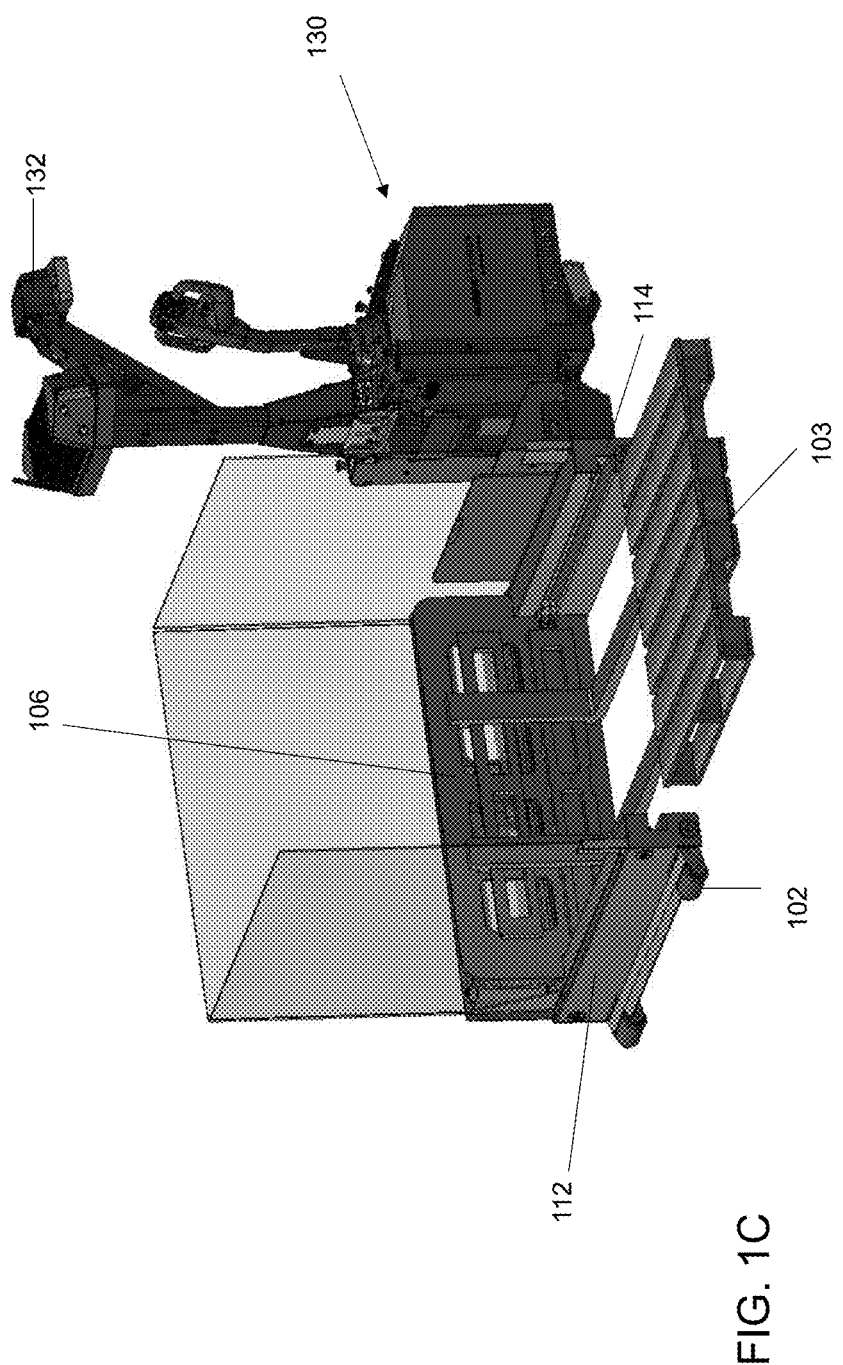

In the example embodiment of FIG. 1C, the forks 110 are lowered and remain aligned with pallet 103. The loading frame 100 has been lowered, as is evident from loading frame wheels 102. Since forks 110 are coupled to the loading frame 100, the forks can be raised and lowered with the loading frame 100. The loading frame 100 and the forks 110 can be structured so that when the loading frame is lowered, the forks are also lowered to an appropriate height to engage the pallet 103. Additionally, in FIG. 1B the forks 110 have begun extension in a horizontal direction, direction F, to engage pallet 103. As is shown in FIG. 1B, the forks 110 are partially extended to engage pallet 103 by insertion into pallet openings.

Lowering the loading frame 100 can include lowering the truck-end arm 114, the side member, the wheel-end arm 112, or a combination thereof. In some embodiments, the payload truck 103 and/or the loading frame 100 can be configured to raise and lower the truck-end arm 114 and the wheel-end arm 112 and side member 106 responsively follow. In some embodiments, the loading frame 100 can be configured to raise and lower the wheel-end arm 112 and the truck-end arm 114 and the side member 106 responsively follow. In other embodiments, the loading frame 100 can be configured to raise and lower the side member 106 and the truck-end arm 114 and the wheel-end arm 112 responsively follow. In other embodiments, the loading frame 100 can be configured to raise and lower two or more of the side member 106, the truck-end arm 114, and the wheel-end arm 112. As will be appreciated by those skilled in the art, various approaches can be used to raise the forks 110, which can include raising and lowering the forks 110 without raising and lowering the loading frame.

Figure 1D:
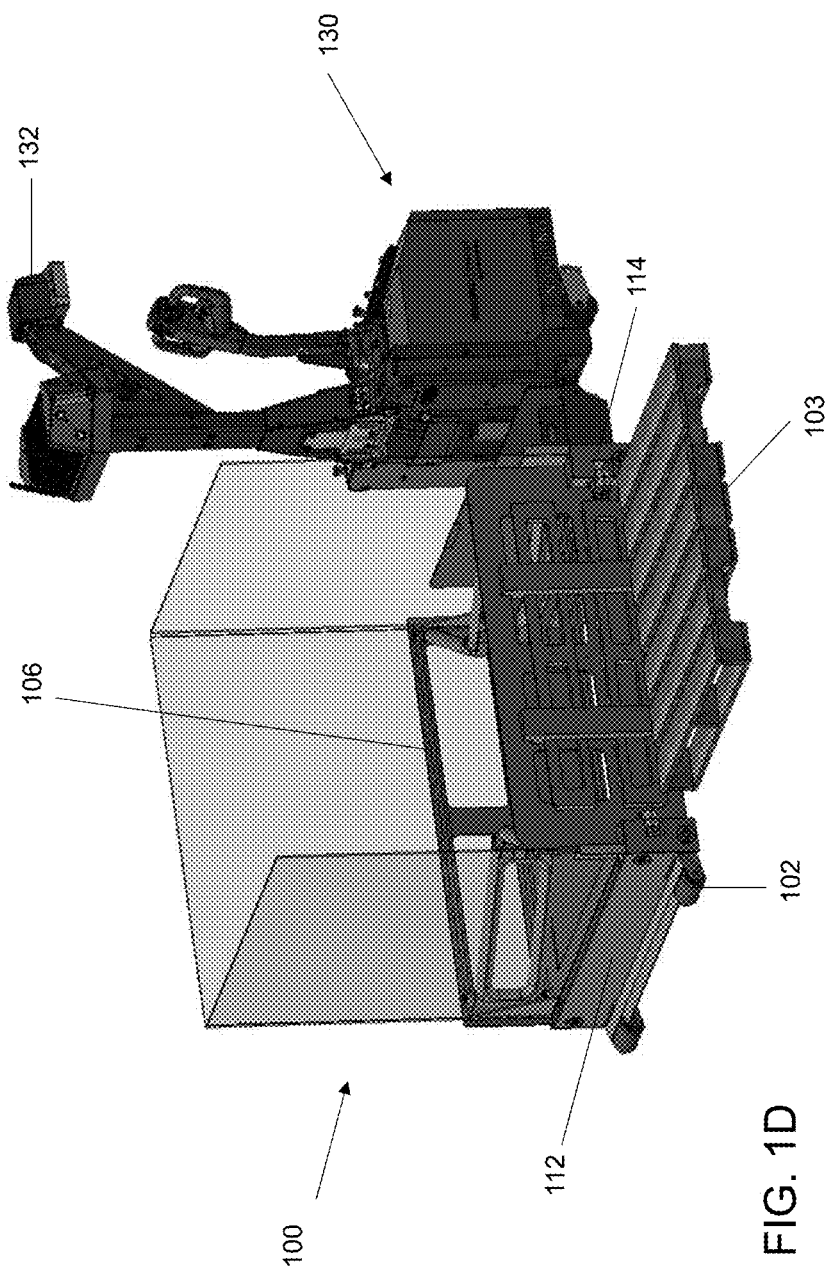

In the example embodiment of FIG. 1D, loading frame 100 has fully extended the forks 110 to prepared to engage a load (e.g., pallet 103, in this example). Note that, although loading frame 100 remains lowered, forks 110 remain sufficiently elevated (a distance less than R) above a floor surface to allow free movement of forks 110 from the retracted position of FIG. 1B to the partially extended position of FIG. 1C, to the fully extended position of FIG. 1D.

Figure 1E:
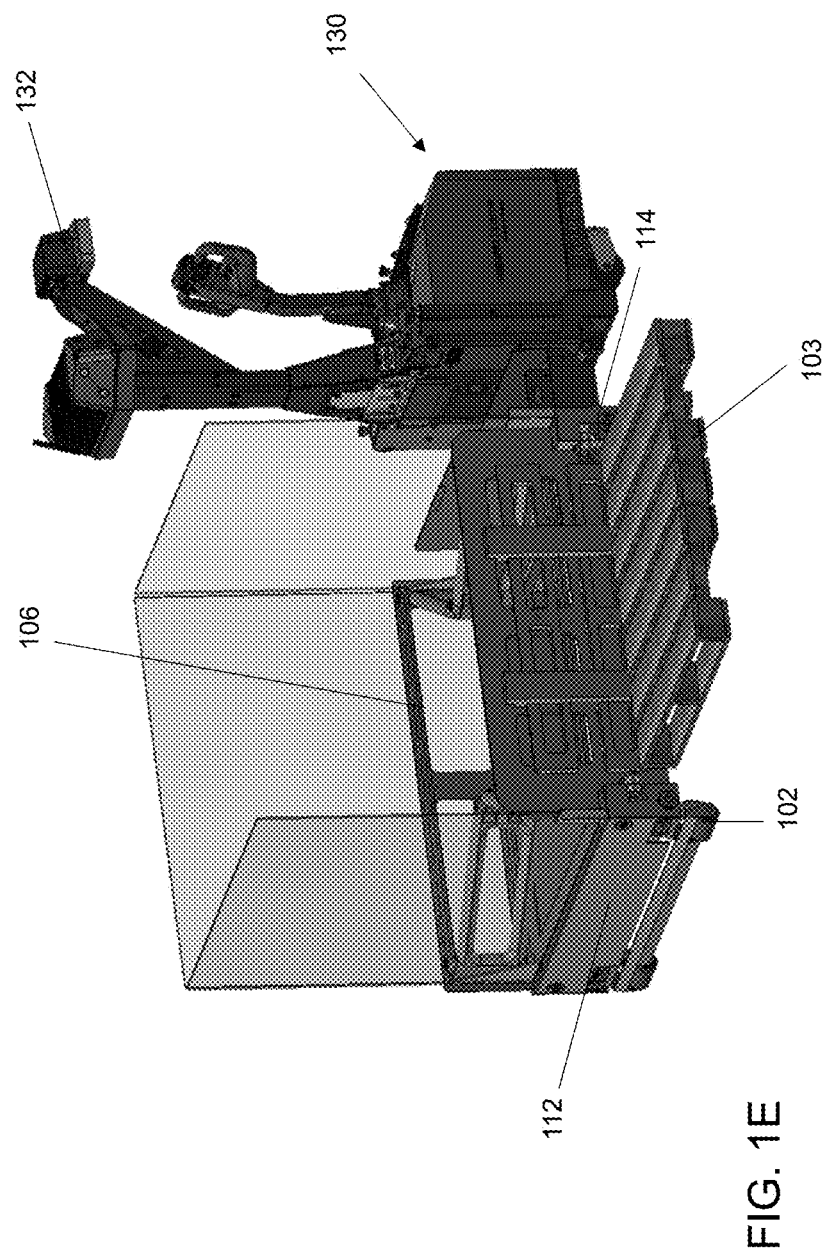

In FIG. 1E, the forks 110 have been raised to engage and lift pallet 103. The loading frame 100 raises load 103 prior to transferring the load 103, as illustrated in the example embodiment of FIG. 1E. Loading frame wheels 102 are orient in a vertical direction, indicating that the loading frame 100 has been raised.

Figure 1F:
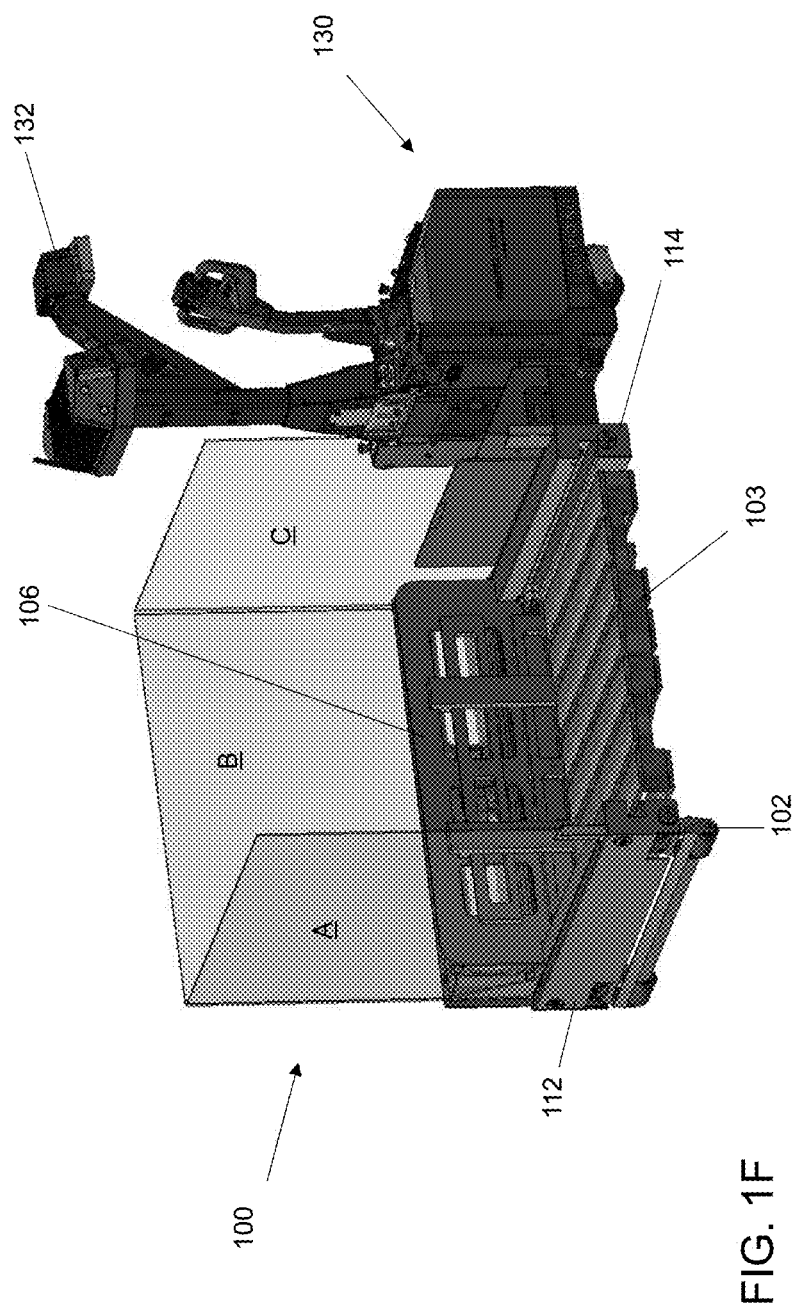

In the example embodiment of FIG. 1F, forks 110 have been retracted, thereby transitioning the pallet 103 to be maintained within the boundaries of loading frame 100. Loading frame wheels 102 remain in a vertically extended position and, with load 103 positioned within the loading frame 100, load 103 is prepared for transfer to another location. With load 103 maintained within the loading frame 100 in this manner, and with support from loading frame wheels 102 at one end and payload truck 130 at the opposing end, the center of gravity of the load 103 remains within the loading frame 100, thereby ensuring safe transport of load 103 without any requirement for counter-balancing weights and the increased costs and maintenance associated therewith.

In various embodiments, the loading frame 100 may include panels, frames, or walls extending upwardly from the wheel-end arm 112, the side member 106, the truck-end arm 114, or two or more thereof. In the embodiments of FIGS. 1A-1F, each of the wheel-end arm 112, the side member 106, and the truck-end arm 114 has a wall A, B, and C, respectively, upwardly extending therefrom. Walls A, B, and C can be structured to at least partially enclose and protect the load 103 once the forks 110 are in their retracted position, as shown in FIG. 1F. In example embodiments, the walls A, B, and C of loading frame 100 can define a rectangular prism volume for the loading of goods for travel.

As will be apparent to those of skill in the art, dropping off a load may be accomplished by, basically, reversing the process just described for retrieving a load, e.g., pallet 103.

Figure 2:
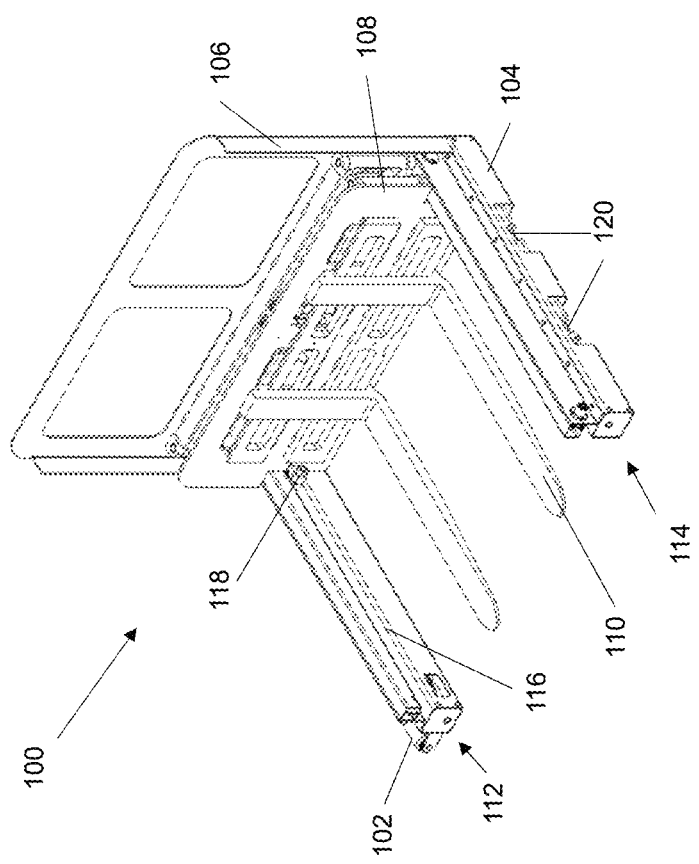
FIG. 2 shows a perspective view of an embodiment of a laterally operating payload handling device with its forks retracted, in accordance with aspects of the inventive concept.

In the example embodiment of FIG. 2, the loading frame 100 is depicted in a perspective view with forks 110 retracted. In this view, the loading frame 100 is shown without the loading truck 130. Loading frame 100 includes loading frame wheels 102 at wheel-end arm 112, a truck interface 104 at a truck-end arm 114, and a side member 106 extending therebetween. Side member 106 provides support for a fork carriage 108, which, in turn, supports forks 110, in this embodiment. Wheel-end arm 112 and truck-end arm 114 include rails 116 that support fork carriage wheels 118. Truck interface 104 includes coupler 120 for secure engagement with a payload handler truck 130. Truck interface 104 may also include a power and control interface that is configured to transfer power from a payload truck to loading frame 100 and to sense and control movement of loading frame 100, including the forks 110. Power provided by payload truck 130 through payload truck interface 104 may be electromechanical, pneumatic, or hydraulic, and may be used to operate loading frame wheels 102 and fork carriage 108 to raise, lower, extend and retract the forks 110, for example. Control provided through the interface may be bidirectional, with sensing provided from loading frame 100 to truck to aid in positioning loading frame 100 and control over movement of fork carriage 108 and articulation of loading frame wheels 102 provided by the truck, for example.

Figure 3:
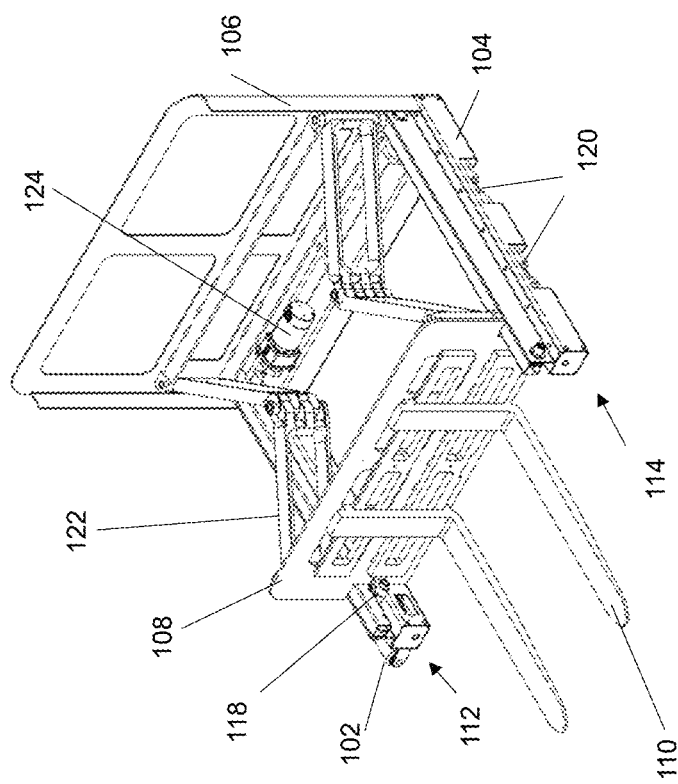
FIG. 3 shows a perspective view of the device of FIG. 2 with its forks extended.

The perspective view of FIG. 3 illustrates an example embodiment of the loading frame 100, with forks 110 extended. In this example embodiment, fork carriage 108 includes hinged extenders 122 that extend and contract in accordion fashion to extend and retract forks 110, moving carriage 108 on fork carriage wheels 118 along rails 116. In this example embodiment, hydraulic cylinder 124 provides motive force for movement of fork carriage 108.

Figure 4:
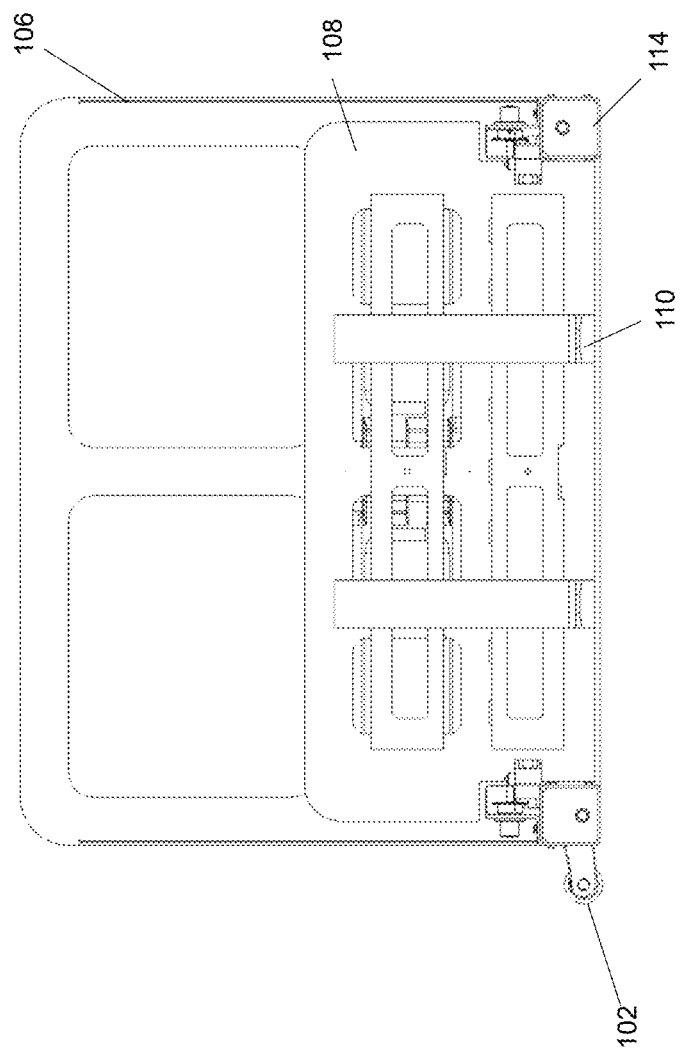
FIG. 4 shows a front view of the device of FIG. 2 in a lowered state.

The front view of FIG. 4 illustrates a front view of loading frame 100, with loading frame wheels 102 extended in a horizontal direction. In example embodiments, loading frame wheels 102 are extended in this manner in concert with the lowering of truck-end arm 114 to lower the entire loading frame 100 in order to engage a load like pallet 103 (that is, pick it up or drop it off).

Figure 5:
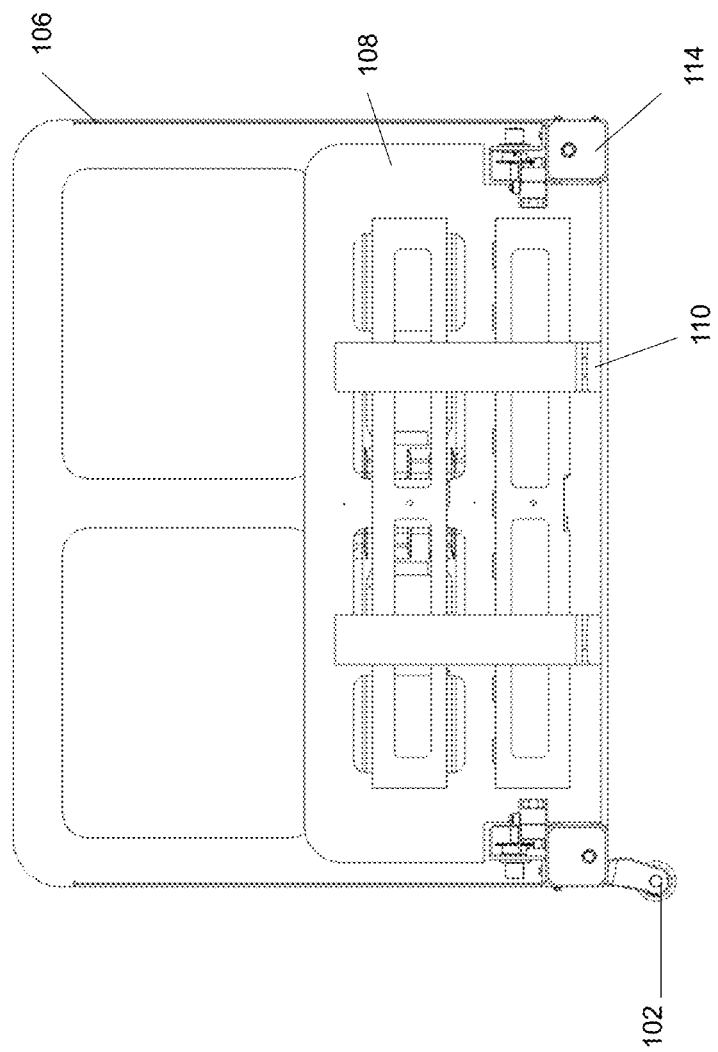
FIG. 5 is shows a front view of the device of FIG. 2 in a raised state.

As illustrated in the front view of FIG. 5, loading frame wheels 102 may be extended in a vertical direction, in concert with the raising of truck-end arm 114, in order to lift loading frame 100. Loading frame 100 may be lifted, for example, to transport the loading frame, loaded or unloaded, to another location.

Figure 6:
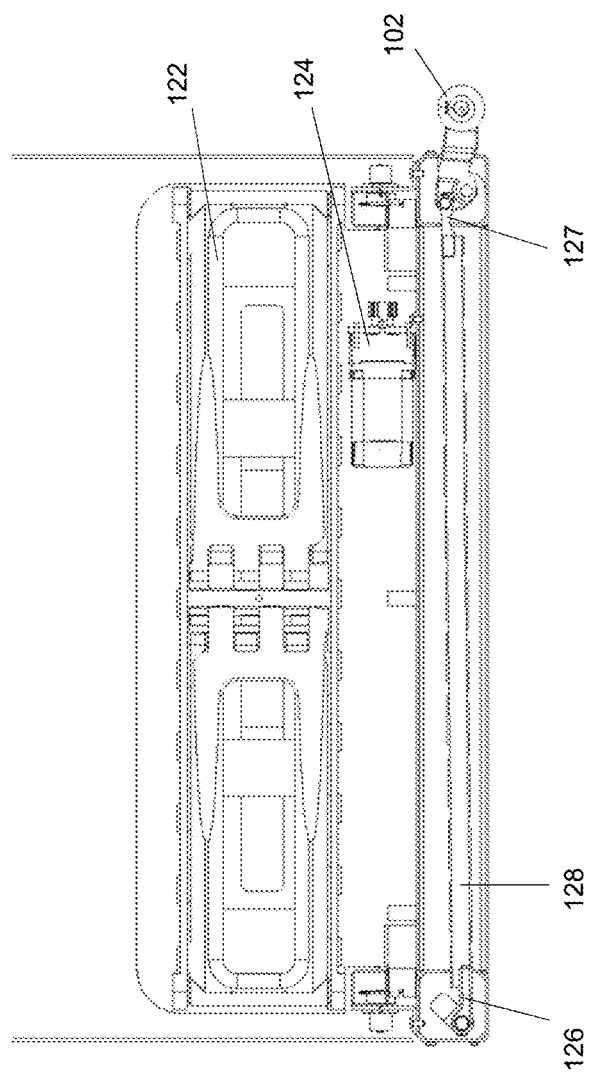
FIG. 6 is a rear cross sectional view of the device of FIG. 2 in a lowered state.
Figure 7:
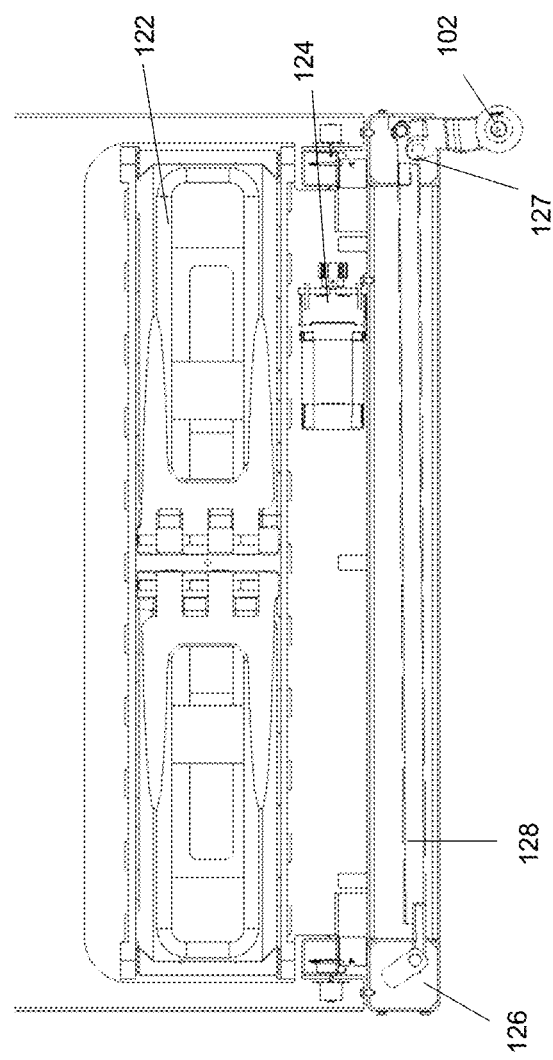
FIG. 7 is a rear cross sectional view of the device of FIG. 2 in a raised state.

The rear cross-sectional view of FIG. 6 provides another view of loading frame 100 in a lowered position, as indicated by wheels 102. As with previous figures and related descriptions, loading frame wheels 102 are extended in a horizontal direction in concert with the lowering of truck-end arm 114 of frame 100 in order, for example, to engage a load, e.g., pallet 103. In this example embodiment, a linkage system including a lever mechanism 126 and link 128 are employed to transition the loading frame wheels 102 between the raised and lowered orientations. In this embodiment, the loading frame wheels 102 extend vertically in the raised orientation and extend horizontally in the lowered orientation. Lever mechanism 126 may matingly engage a truck mechanism that operates the lever mechanism according to the position of the truck's mast. That is, the truck may place mechanism 126 in a first, lowered position when the truck mast is lowered, and place the mechanism in a second, raised position (illustrated in FIG. 7, for example) when the truck mast is raised. Linkage 128 may be a rod, beam, or other member capable of transferring both compressive and tensile forces to complementary wheel lever 127 in order to raise or lower wheels 102.

As noted above, the example embodiment of FIG. 7 provides a view of the loading frame 100 in a raised position. In this example embodiment, lever mechanism 126 is in a second, raised position that applies a compressive force through linkage 128 to wheel lever 127, thereby extending wheel 102 in the vertical direction and, in combination with the raising of the truck-end arm 114 of the loading frame 100 through operation of the truck's mast, raising the entire loading frame, for example, for translation of a loaded or unloaded loading frame 100.

Figure 8:
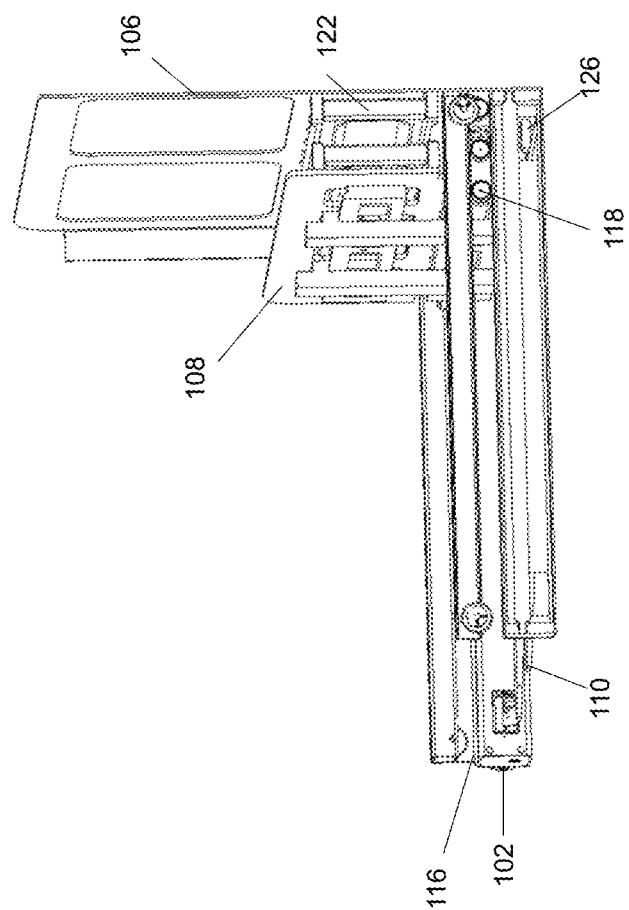
FIG. 8 is a right perspective cross sectional view of the device of FIG. 2 with its forks retracted.

FIG. 8 provides a right-perspective ("right" when facing loading frame 100 from the fork side) cross-sectional view of the loading frame 100 with the forks 110 retracted. In this example embodiment, loading frame wheels 102 are extended in the horizontal direction, with the truck (not shown) operating loading frame wheels 102 through interaction with linkage mechanism 126 while also lowering loading frame 100 at truck-end arm 114. Fork carriage 108 is supported by fork carriage wheels 118, which allow the fork carriage 108 to move along rails 116, as previously described. Hinged extenders 122 are folded in a closed position, thereby retracting fork carriage 108 and forks 102.

Figure 9:
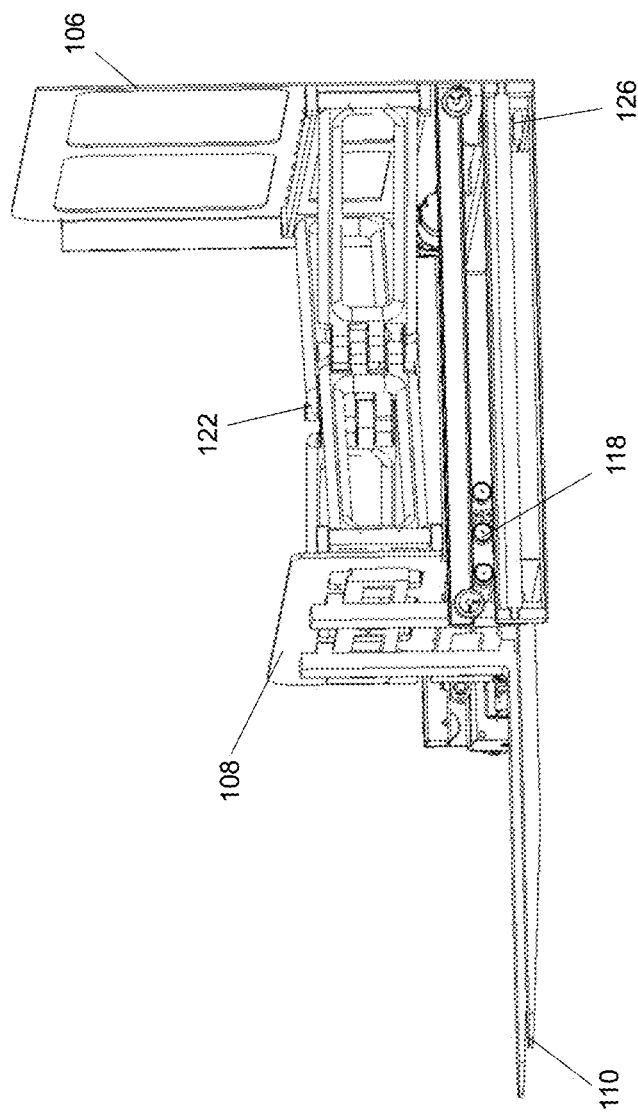
FIG. 9 is a right perspective cross sectional view of the device of FIG. 2 with its forks extended.

In the example embodiment of the right cross-sectional view of FIG. 9, the forks 110 are extended, as they would be to engage a load (not shown). As with the example embodiment of FIG. 8, the loading frame wheels 102 are extended in the horizontal direction, with the truck (not shown) operating the loading frame wheels 102 through interaction with linkage mechanism 126, while also lowering loading frame 100 at truck-end arm 114. Fork carriage 108 is supported by fork carriage wheels 118, which allow the fork carriage 108 to move along rails 116. Hinged extenders 122 are unfolded in an open position, thereby extending the fork carriage 108 and the forks 102.

Figure 10:
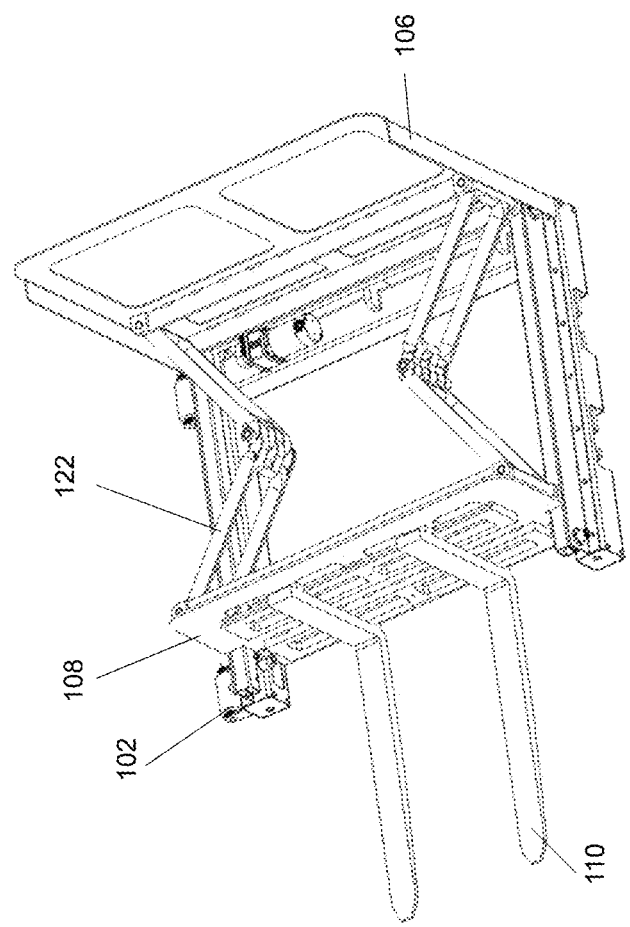
FIG. 10 shows a top perspective view of the device of FIG. 2 with its forks extended.
Figure 11:
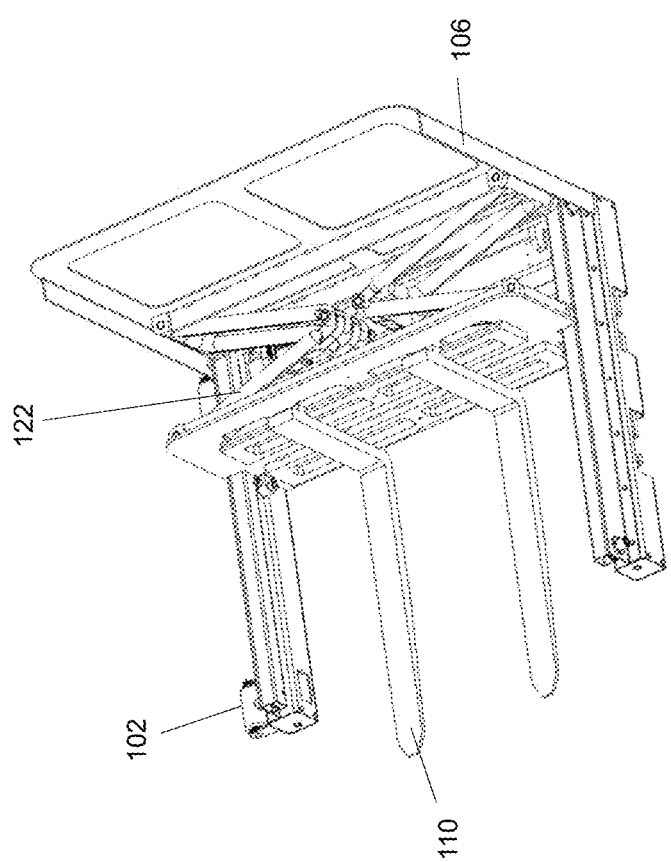
FIG. 11 shows a top perspective view of the device of FIG. 2 with its forks partially extended.

The top perspective views of FIGS. 10 and 11 illustrated the loading frame 100 with forks extended and retracted, respectively. As described in the discussion related to FIGS. 8 and 9, loading frame wheels 102 are extended in a horizontal direction, resulting in loading frame 100 being in a lowered position. In a lowered position, as in FIGS. 10 and 11, the loading frame 100 may be positioned to engage with a load (not shown) by extending forks 110 from the retracted position of FIG. 11 to the extended position of FIG. 10 to couple with a palletized load, e.g., pallet 103, and to then lift or hoist the load by extending loading frame wheels 102 in a vertical, rather than horizontal, direction. Once lifted in this manner, the load may be repositioned within the loading frame 100 by retracting forks 110 and fork carriage 108 by folding hinged extenders 122.

Figure 12:
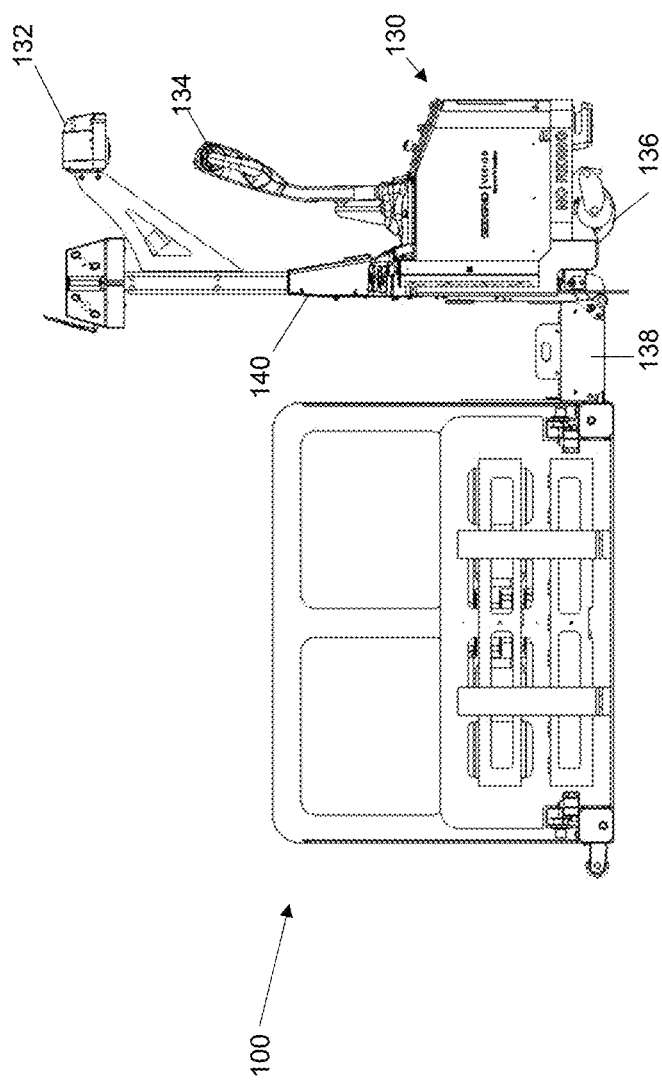
FIG. 12 shows a front view of the device of FIG. 2 engaged by a payload truck.
Figure 13:
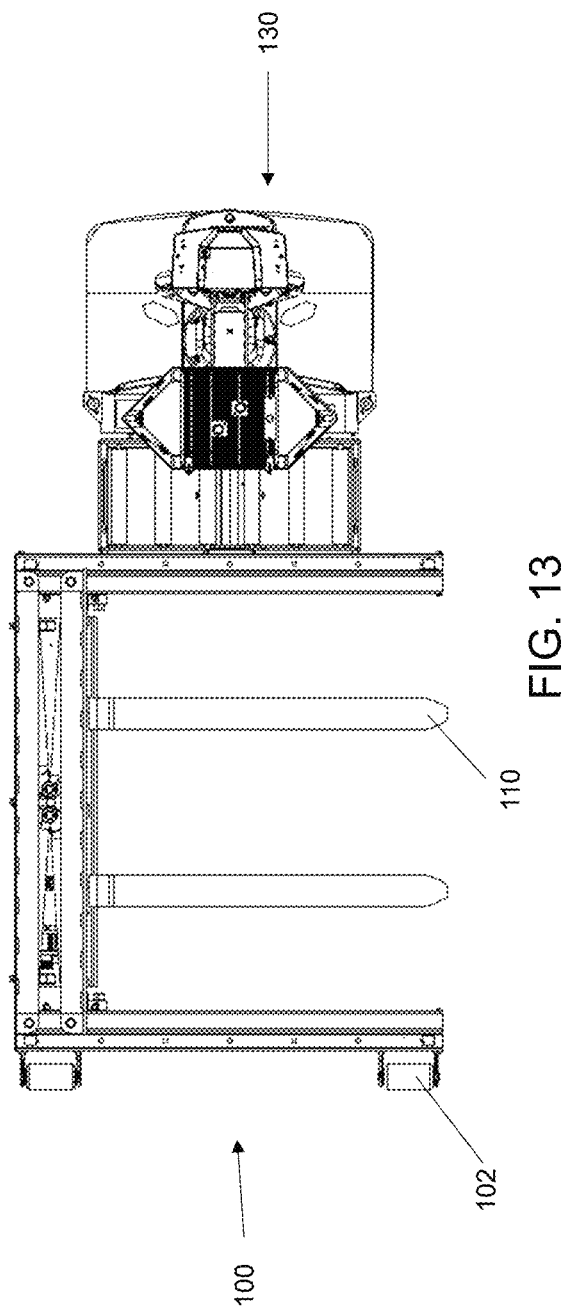
FIG. 13 shows a top view of the device of FIG. 2 engaged by a payload truck.

A front view, a view looking toward the fork side of loading frame 100, and a top view are illustrated, respectively, in the example embodiments of FIGS. 12 and 13, in which loading frame 100 is engaged by payload truck 130. As previously described, payload truck 130 may be automated, manual, or a combination of the two and, in this example embodiment, payload truck 130 includes drive controls (which may also be referred to as a "tiller") 134, for manual operation, sensor head 132 to aid in navigation, drive wheels 136 to supply motive force to payload truck 130, a mast 140, and a platform 138 for engagement with loading frame 100. As previously described, in example embodiments, payload truck 130 engages with loading frame 100 through an interface which may include coupling mechanisms by which payload truck 130 securely engages loading frame 100 for lifting and lowering through operation of mast 140 and may, additionally, operate a linkage that extends loading frame wheels 102 in a vertical or horizontal direction in order to match the lowering or raising, respectively, of mast 140.

Figure 14:
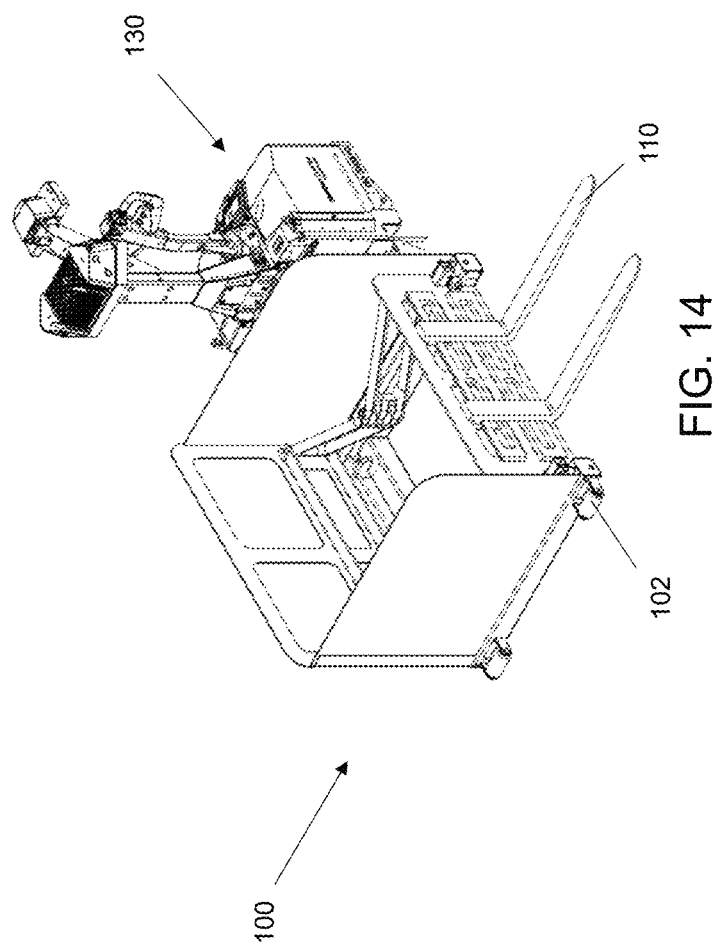
FIG. 14 shows a perspective view of the device of FIG. 2 engaged by a payload truck with the forks extended.
Figure 15:
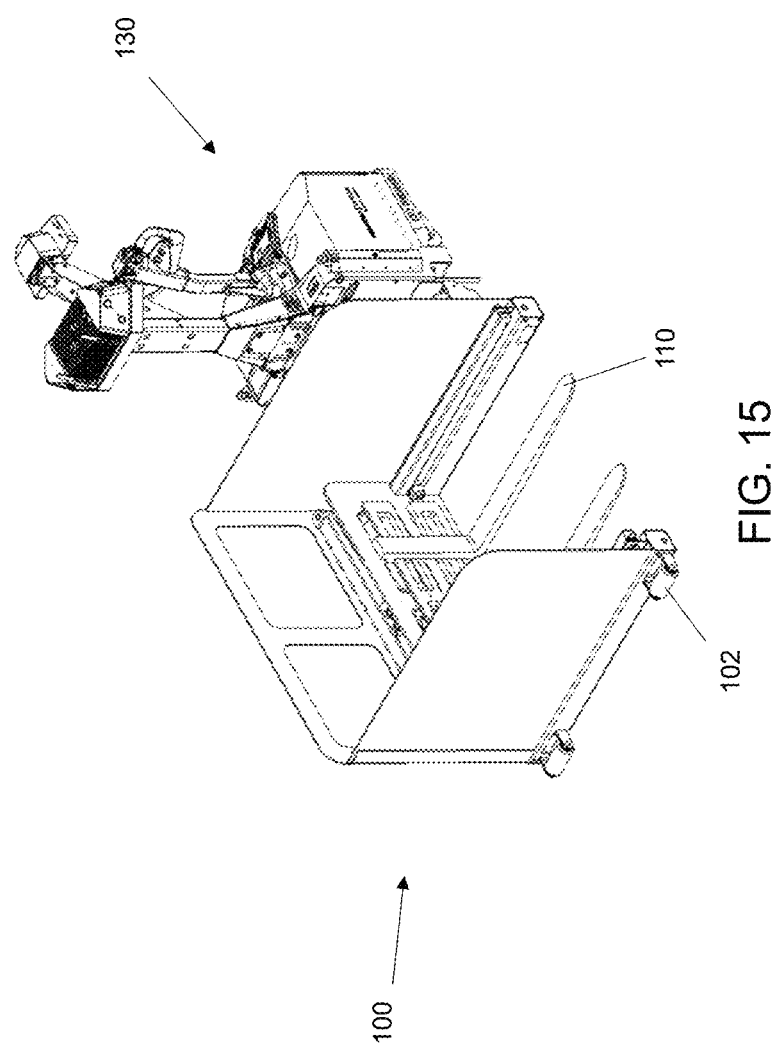
FIG. 15 shows a perspective view of the device of FIG. 2 engaged by a payload truck with the forks retracted.

In the perspective view of FIGS. 14 and 15, the payload truck 130 is combined with loading frame 100 in an operational configuration. Payload truck 130 operates the loading frame 100 to extend forks 110 in FIG. 14 and to retract forks 110 in FIG. 15. In both FIG. 14 and FIG. 15, the loading frame wheels 102 are extended in the horizontal direction as they would be when engaging a load (that is, either retrieving or depositing a load).

A laterally operating payload handling device in accordance with principles of inventive concepts is capable of engaging and retrieving payloads arranged to the side of a vehicle. In example embodiments the device includes an engagement mechanism that includes a low level lifter and an extending fork or paddle. By low-level lifter, we mean a lifter that is capable of lifting a distance R, less than the height of the loading frame 100 and, in some embodiments, less than a distance R of about six inches. The mechanism is driven to a payload retrieval location, the fork is lowered, extended, raised and retracted to capture the payload for travel. The vehicle may then travel away along the path it was originally travelling (forward or backward), without need for turning to engage the payload. In example embodiments, such a device may be used primarily for floor-level lifting, transport, and placement.

A payload handler in accordance with principles of inventive concepts may operate in a manner similar to a pallet jack, in that the lifting mechanism does not require the vehicle to be counterbalanced. The frame around the extending forks can be attached to the truck on one end, and supported by wheels on the other, opposite end. These wheels raise and lower one end of the frame, while the other end is raised with the truck body. Only during the lift cycle may any of the load be outside of the loading, and never during travel.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. A loading frame, comprising:
   a frame comprising a wheel-end arm, a truck-end arm, and a side member connecting the wheel-end arm and truck-end arm at respective side-member ends, and at least one loading frame wheel coupled to the frame and arranged to facilitate travel of the frame in a frame travel direction; and one or more forks coupled to the frame and configured to extend and retract in a fork direction that is transverse to the frame travel direction, wherein the forks are further configured to engage a load when extended and support a load for travel when retracted.

2. The loading frame of claim 1, wherein the forks are configured as a low-level lifter to engage and carry a load at a height less than the height of the frame.

3. The loading frame of claim 2, further comprising:

a truck interface formed in the truck-end arm configured to couple with a payload truck configured to move the frame in the travel direction.

4. The loading frame of claim 1, further comprising a fork carriage to support at least one fork.

5. The loading frame of claim 4, wherein the fork carriage includes a fork carriage drive and fork carriage support.

6. The loading frame of claim 5, wherein the fork carriage drive includes accordion-style folding drive members.

7. The loading frame of claim 5, wherein the fork carriage support includes rails and fork carriage wheels to rollingly support the fork carriage as it moves in the fork direction.

8. A loading frame, comprising:

a U-shaped frame including an open side;

forks extendable and retractable in a fork direction through the open side;

one or more loading frame wheels on a wheel-end arm of the U-shaped frame;

a truck interface on a truck-end arm of the U-shaped frame, wherein the loading frame wheels and truck interface support travel of the loading frame in a travel direction that is transverse to the fork direction.

9. The loading frame of claim 8, further comprising:

a fork carriage configured to support the forks and to retract and extend the forks in the fork direction.

10. The loading frame of claim 8, wherein the loading frame wheels are extendable in vertical and horizontal directions to thereby, respectively, raise or lower the loading frame.

11. The loading frame of claim 8, wherein the truck interface includes a linkage configured to allow a payload truck to raise and lower the frame.

12. The loading frame of claim 8, wherein the wheel-end and truck-end arms of the frame include rails and the fork carriage includes fork carriage wheels to rollingly support the carriage on the rails for extending and retracting the forks.

13. A payload handler, comprising:

a payload truck; and a loading frame coupled to the payload truck, the loading frame including:

a frame comprising a wheel-end arm, a truck-end arm, and a side member connecting the wheel-end arm and truck-end arm at respective side-member ends, and at least one of the one or more loading frame wheels is coupled to the wheel-end arm arranged to facilitate travel of the frame in a frame travel direction;

a truck interface configured to couple with a payload truck; and one or more forks coupled to the frame and configured to extend and retract in a fork direction that is transverse to the frame travel direction, wherein the forks are further configured to engage load when extended and support a load for travel when retracted.

14. The payload handler of claim 13, wherein the forks are configured as a low-level lifter to engage and carry a load at a height less than the height of the frame.

15. The payload handler of claim 13, further comprising a fork carriage to support at least one fork.

16. The payload handler of claim 15, wherein the fork carriage includes a fork carriage drive and fork carriage support.

17. The payload handler of claim 16, wherein the fork carriage drive includes accordion-style folding drive members.

18. The payload handler of claim 16, wherein the fork carriage support includes rails and fork carriage wheels to rollingly support the fork carriage as it moves in the fork direction.

19. The payload handler of claim 13, wherein the payload truck is configured to operate the loading frame wheels to extend in a horizontal direction and to simultaneously lower the truck-end of the loading frame or to operate the loading frame wheels to extend in a vertical direction and to simultaneously raise the truck-end of the loading frame.

20. The payload handler of claim 13, wherein the payload truck is configured to operate autonomously.

* * * * *